US006514139B2

(12) United States Patent
Levitan

(10) Patent No.: US 6,514,139 B2
(45) Date of Patent: Feb. 4, 2003

(54) COIN AND BILL VIDEO GAME TERMINAL SYSTEM

(75) Inventor: Valery Levitan, Thornhill (CA)

(73) Assignee: JVL Corporation, Concord ( * ) Notice: Subject to any disclaimer, the term of this patent is extended or adjusted under 35 U.S.C. 154(b) by 0 days.

(21) Appl. No.: 09/577,821

(22) Filed: May 25, 2000

(65) Prior Publication Data

US 2002/0155875 A1 Oct. 24, 2002

(51) Int. Cl.[7] ................................................ A63F 13/00

(52) U.S. Cl. ............................ 463/16; 463/40; 463/42; 463/25

(58) Field of Search ............................ 463/16, 42, 41, 463/40, 1, 25, 29; 700/91; 705/14

(56) References Cited

U.S. PATENT DOCUMENTS

| | | | | | |
|---|---|---|---|---|---|
| 4,669,730 A | * | 6/1987 | Small | ......................... | 463/16 |
| 5,779,549 A | | 7/1998 | Jorasch | | |
| 5,893,075 A | * | 4/1999 | Plainfield et al. | ............ | 705/14 |
| 5,917,725 A | * | 6/1999 | Thacher et al. | ............... | 463/29 |
| 6,007,426 A | * | 12/1999 | Kelly et al. | ................... | 463/16 |
| 6,015,344 A | * | 1/2000 | Kelly et al. | ................... | 463/16 |
| 6,179,710 B1 | * | 1/2001 | Sawyer et al. | ................ | 463/16 |

FOREIGN PATENT DOCUMENTS

| | | |
|---|---|---|
| DE | 4200254 A | 8/1993 |
| DE | 29816305 U | 1/2000 |
| WO | WO 97 27568 | 7/1997 |
| WO | WO 97 37737 | 10/1997 |
| WO | WO 98 18532 | 5/1998 |

* cited by examiner

*Primary Examiner*—Jessica Harrison

(57) ABSTRACT

A coin operated video game terminal system includes a tournament mode, as well as an option for a user to enter a random draw for each game played. This arrangement acts as an incentive for competitive play, as well as rewarding users for games played. The system also allows identification and tracking of users which is useful information for the terminal provider. Each terminal tracks games played and money received, and forwards the information to a central computer. Electronic financial tracking of revenue received allows the location operator to access and remove the actual cash received and the location operator is then billed by the terminal provider for his share of revenue received.

18 Claims, 8 Drawing Sheets

COIN AND BILL VIDEO GAME TERMINAL SYSTEM

BACKGROUND OF THE INVENTION

The present invention relates to video game terminal systems, and in particular, to video game terminal systems where a number of terminals are linked and share information with a remote computer.

Coin and bill operated video game terminals provide a popular source of entertainment are commonly provided in bars and restaurants.

The sophistication of the video games continues to increase and the processing capability and speed of the terminal has also increased. Most video game terminals now use a computer processor similar to pentium processors and include extensive memory storage arrangements for audio and graphical files used by the video games. Some video game terminals have as many as 60 (+) different games which can be played, some of which are very memory intensive, whereas other games such as simple card games, require much less memory.

The terminals provide additional revenue which is normally divided between the location owner and a company which is providing or leasing the terminal to the particular location. Some video game terminals have been linked with a central computer for operating certain games in a tournament mode. The game results of the particular tournament game are provided to a central computer and the results are accessible at each terminal. It is common in such tournaments to have a local leading score as well as the overall network leading scores.

Prizes have been suggested with respect to rewarding the individual leaders of the tournament but in many jurisdictions, such an arrangement is illegal. The advantage of the tournament mode is that it acts as an inducement and the number of games played per terminal typically goes up.

Surprisingly, some individual patrons are high users of the terminal and often this use is dominated by one particular game. From a marketing point of view, it would be desirable to have additional information with respect to the number of users using a particular terminal, the particular games played, as well as the frequency with which games are played by location and by user.

The present invention provides a system which encourages the identification of users and acts as an inducement promoting use of the terminal.

SUMMARY OF THE INVENTION

A coin and/or bill operated video game terminal according to the present invention, allows for playing of a video game and the entry of information identifying the user. It also allows entry of the user in a random draw or contest. The apparatus game terminal comprises a payment arrangement for receiving payment and authorizing initiation of a game from a series of games retained in memory. A registration query provided on a touch screen of the game terminal allows the entry of registration information to properly identify a user. In addition the terminal allows entry of a PIN number assigned to a previously registered user to act as part of the sign in procedure.

The terminal includes a counting arrangement for maintaining a count for each registered user which count is incremented with each authorized game associated with the user. A communication arrangement associated with the terminal communicates with a separate remote computer and provides thereto the counts of the different registered users for entry in a random draw, based on each count providing an opportunity to win the draw.

According to an aspect of the invention, the coin operated game terminal provides the user with a host of games for selection and each game, when activated, buy an identified registered user will increment the count of the user.

A coin operated video game terminal according to the present invention comprises a touch screen for accommodating user input of information, a series of games displayed on the touch screen for possible selection and play by user, either as a non identified user or as a particular registered user. The terminal includes a payment arrangement for accepting payment and initiating play of any of said series of games. An onscreen registration option is provided for registration of a player with the terminal, and automatically enters the player in a random draw based on the number of times games are played by the user and identified as being played by a particular user.

The game terminal includes a counting arrangement for tracking the number of games played by the registered user and automatically enters the registered users in a random draw based on the number of games played identified as being played by the registered user.

According to a further aspect of the invention, at least some of the games of the video game terminal are operated in a tournament mode and a ranking is provided of at least several leading registered users and their particular best game results.

According to yet a further aspect of the invention, the game terminal includes a communication arrangement for communicating registration information and count information of a registered user to a remote computer which maintains the information for entry in the random draw.

According to yet a further aspect of the invention, the game terminal includes a non volatile memory arrangement for maintaining registration and count information until such information is communicated to the remote computer.

According to yet a further aspect of the invention, only a limited number of games are operated in Random Draw (Touch and Win) mode at any given time and draw mode games are clearly identified and distinguishable from non tournament mode games when said games are displayed on said touch screen for selection.

According to yet a further aspect of the invention, the game terminal identifies certain games as being available for purchase by a user and payment for the purchase of the game made using said payment arrangement and delivery arrangement as provided by the user using the touch screen to enter sufficient information to allow delivery of the game. Profit from purchased game revenue received by the terminal is split between the manufacturer, operator and location according to a predetermined distribution.set %.

According to yet a further aspect of the invention, the delivery information is an e-mail address and said game is provided in an e-mail to said e-mail address.

According to yet a further aspect of the invention, the terminal provides said game purchase and delivery information to said remote computer for delivery of said game to said e-mail address.

According to yet a further aspect of the invention, the coin operated video game terminal includes a revenue sharing arrangement. Revenue collected by the video game terminal is divided between an on site operator and a terminal provider. The terminal maintains an electronic count of revenue collected and communicates this electronic count to a remote computer using the communication arrangement. The on site operator is debited for the portion of the collected revenue due to the terminal provider for the benefit of the terminal provider, and the operator removes and receives the benefit of the revenue collected by the video game terminal.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
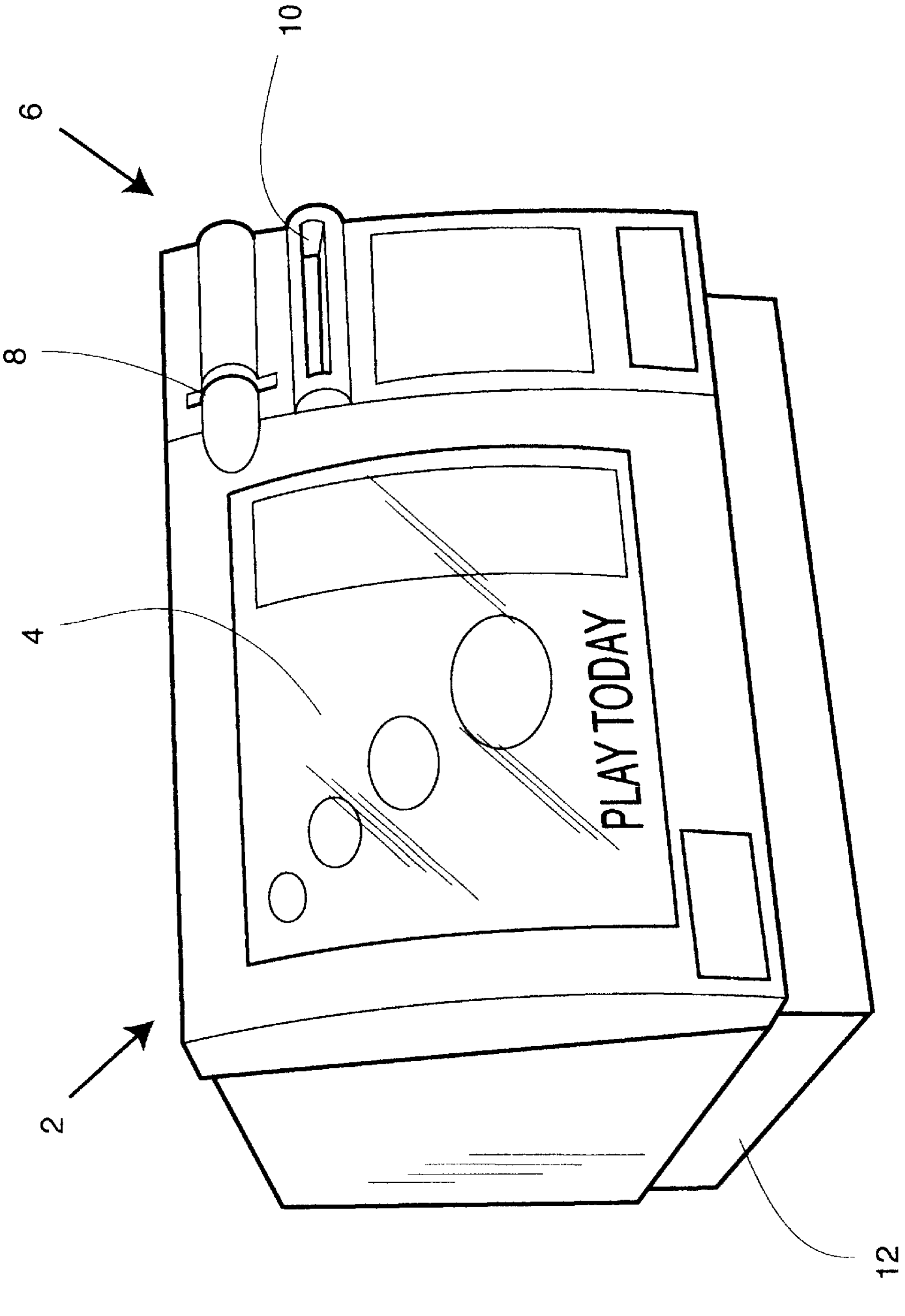
FIG. 1 shows a video game terminal.

The video game terminal 2 of FIG. 1 has a touch screen 4 for the input of information by the user to the terminal. The touch screen allows the user to play the particular game, to activate different games, and to input other information when necessary.

For example, the computer software can provide a representation on the touch screen which includes a registration screen having a keyboard representation at the bottom. This keyboard representation allows the user to input typed information to the terminal. A payment arrangement 6, in this case, includes a coin acceptor 8 and a bill acceptor 10. Other payment arrangements are possible.

The terminal has a communication cable 12 for connection to a communication system whereby information from the terminal can be communicated to a remote computer. Different types of communication arrangements can be used, including communication through the telephone system.

The video game terminal of FIG. 1 is typically provided in a bar or restaurant location.

Figure 2:
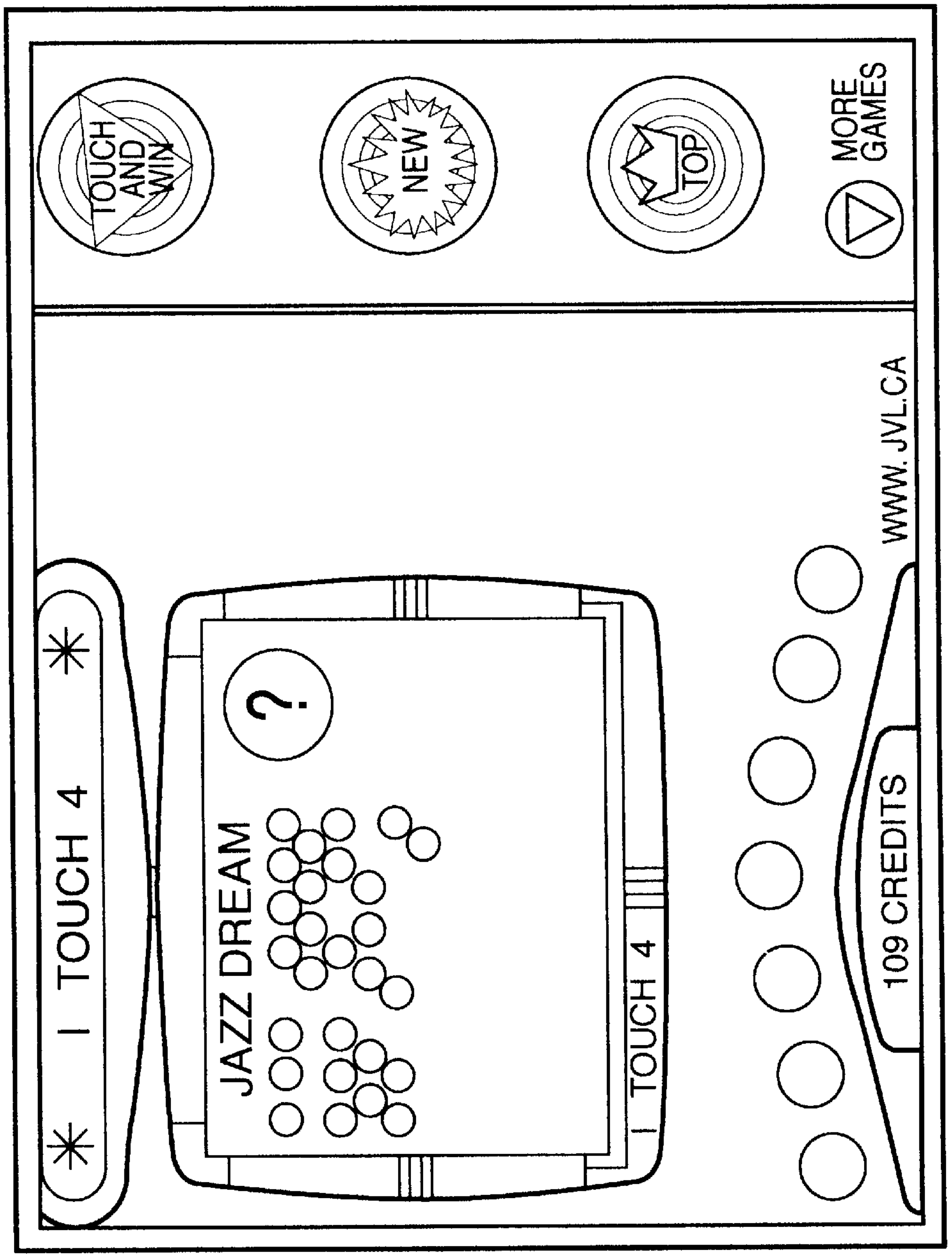
FIG. 2 shows one possible default screen used to allow a user to select a desired mode of play.

FIG. 2 shows one possible default screen. This screen promotes play of a particular game "JAZZ DREAM". Activation of the screen in the "JAZZ DREAM" area initiates the start of the game. Four activation areas "TOUCH AND WIN", "NEW", "TOP" and "MORE GAMES" are provided at the right hand edge. Activation of "TOUCH AND WIN" takes the player to the sign in screen of FIG. 3. Activation of "NEW" produces a screen illustrating new games. Activation of "TOP" takes the player to the screen of FIG. 6 listing the top games in the first column, and other game criteria in the second column. Activation of "MORE GAMES" provides a screen similar to the screen of FIG. 6 but having other games in the first column.

It has been found that different games appeal to different clients and games popular in one location may not be popular in another location. There is also a time element to certain games. For example, a new game may be introduced and become extremely popular only to be replaced in popularity by a different game sometime later. Typically, less than 50 percent of the games contribute 80 percent of the revenue, but the popular games vary from time to time. A player touches the screen at the appropriate location to activate a game, or input different instructions.

Figure 5:
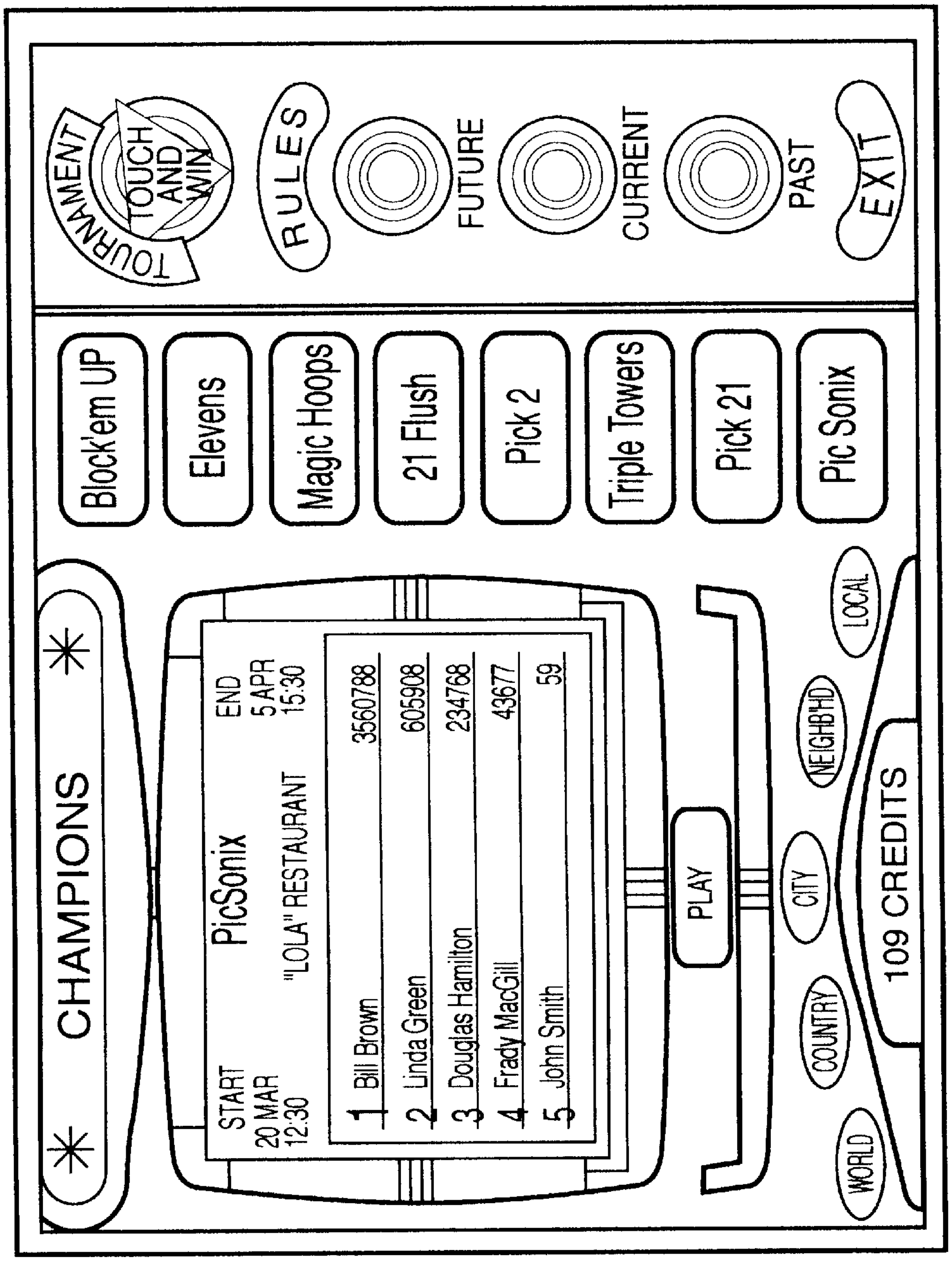
FIG. 5 is a tournament mode screen.
Figure 6:
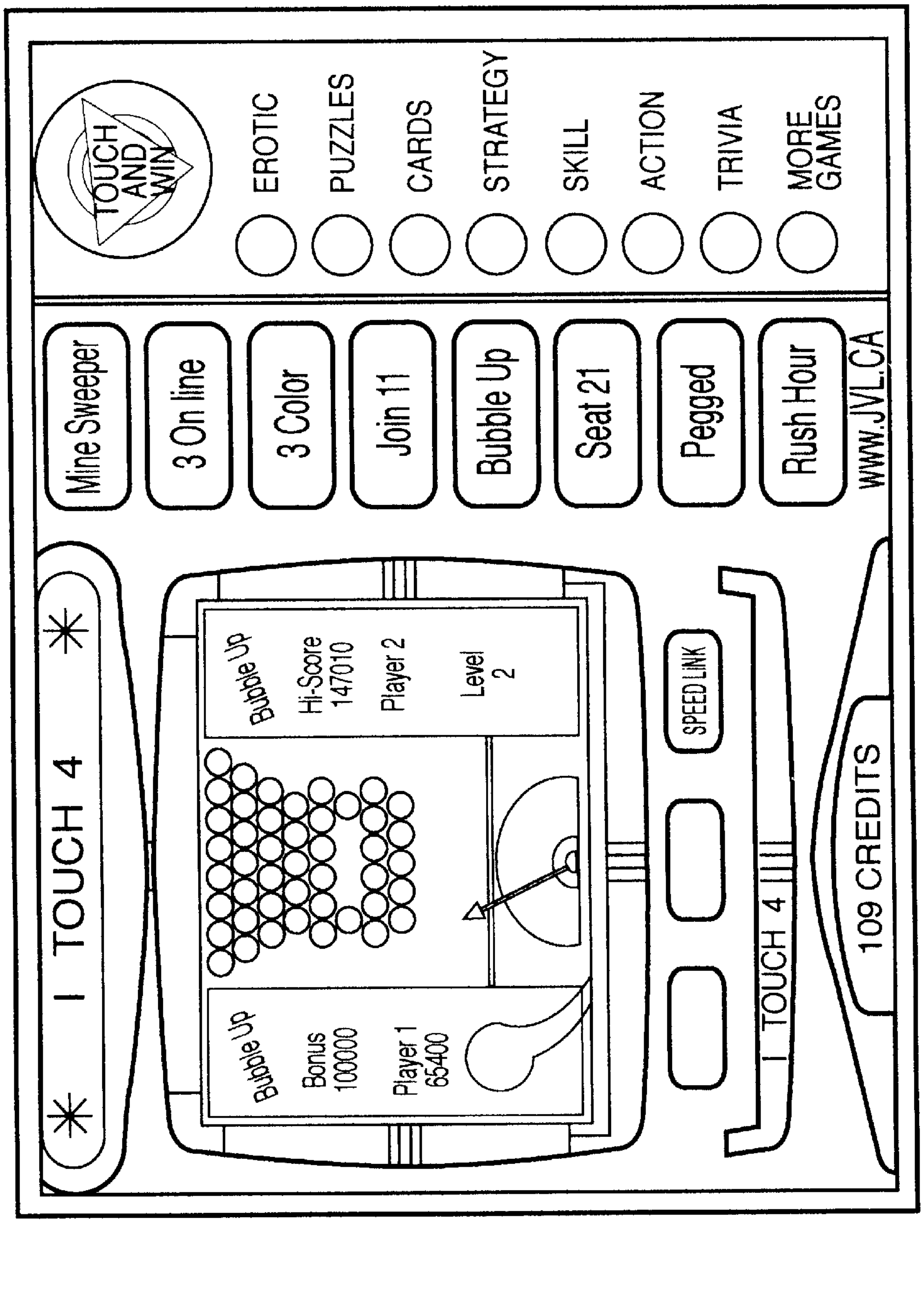
FIG. 6 is a game selection screen.

The touch screen 4 of FIG. 6 has icons 20 representing a partial listing of games that are possible. In addition, there is a tournament icon 24 (TOUCH AND WIN) allowing a player to activate the tournament function. Activation of this icon takes the player to the sign in screen of FIG. 3. A previously registered user fills in his "nickname" and password. Acceptance of these terms takes the player to the screen of FIG. 5.

The screen of FIG. 5 displays the present tournament or contest game "PICSONIX" and a list of present leaders. The first column of activation icons is a list of games including the present contest game "PICSONIX". The second column at the right hand edge of the activation screen provides details of the current contest "PICSONIX", details of past contest games, details of future contest games, as well as Rules of the contest. A play icon is also provided beneath the details of the contest game. It is preferred that only one game be in contest mode at any one point in time, however, multiple contest games can be operating at the same time.

Figure 3:
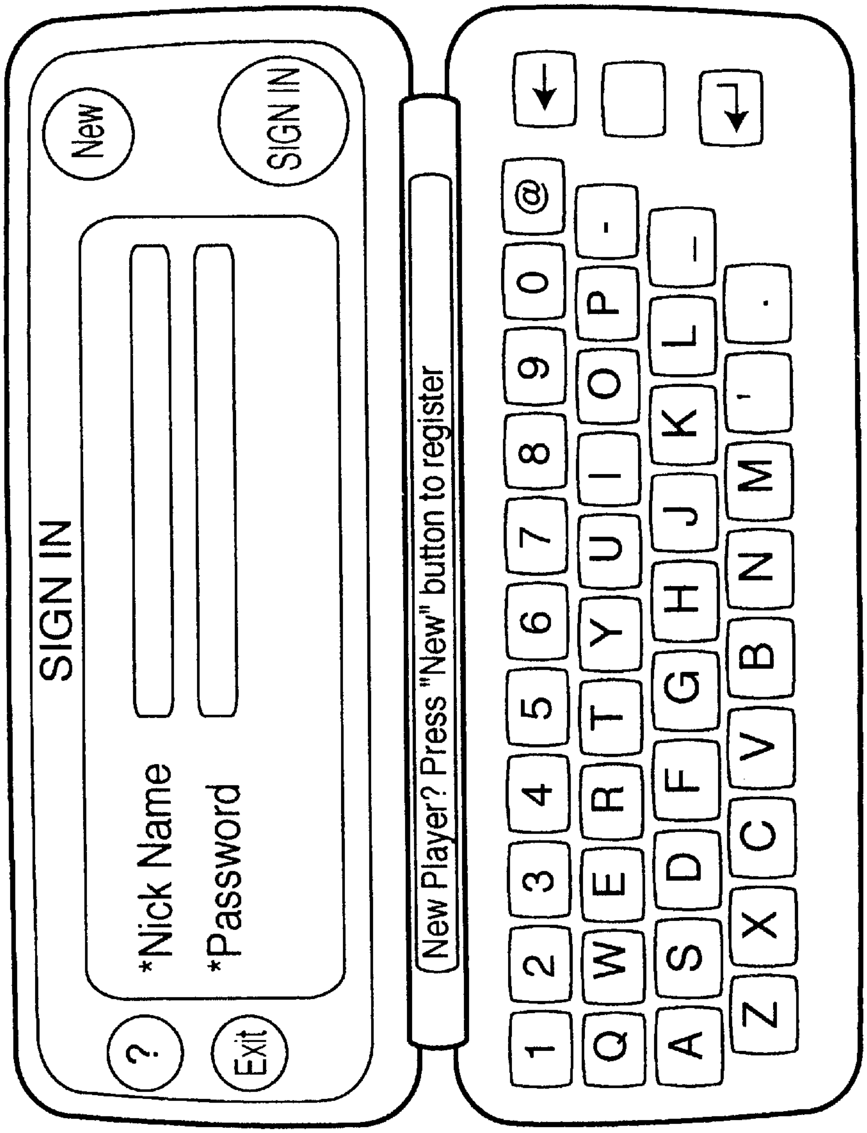
FIG. 3 is a screen used to allow a registered player to sign in or to allow a new player to be linked to a registration screen.
Figure 4:
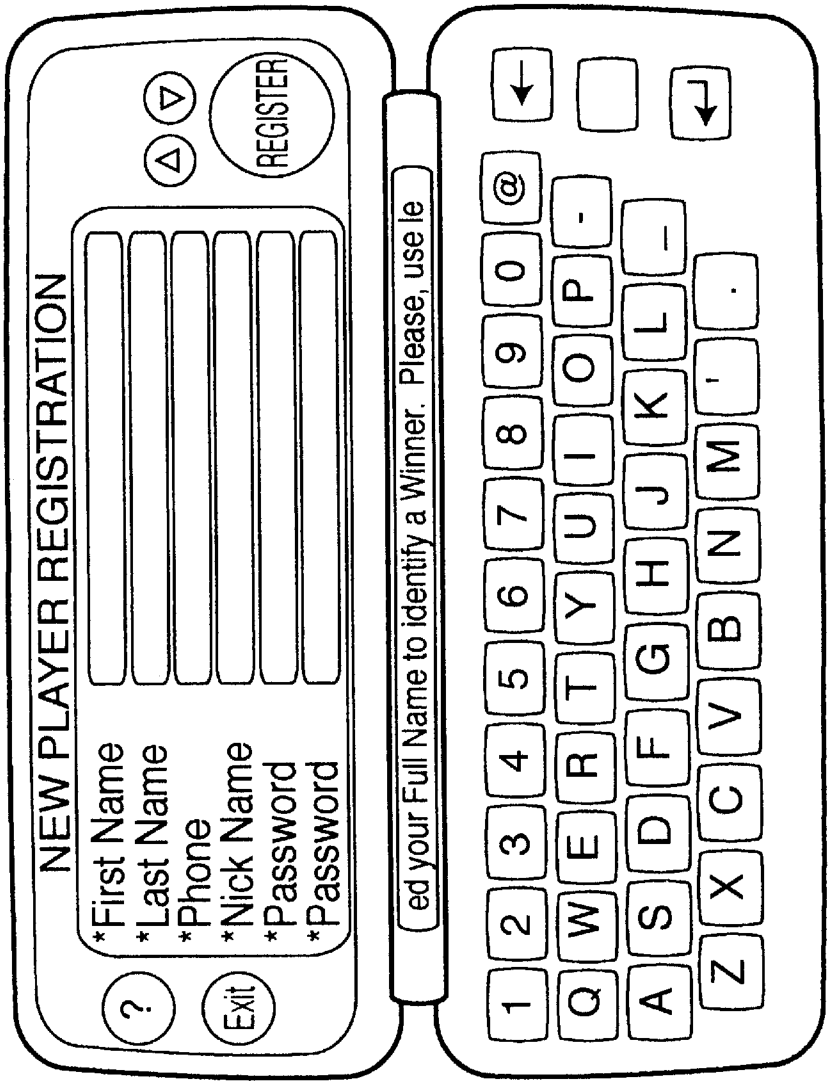
FIG. 4 is a player registration screen.

FIGS. 3 and 4 show screens with a keyboard representation 44 allowing a player to input information necessary for registration or sign in.

The coin operated video game terminals 2 provide additional revenue for the particular establishment which is shared with the provider of the terminal. The removal of the coins and bills which accumulate in the video game terminal has previously been labour intensive as the terminal provider is typically in control, or present, when the "cash box" is opened. This requires a collector to physically attend at each location and open each cash box with someone from the location being present. The funds can then be divided in the predetermined manner. Unfortunately, this approach is labour intensive and subject to shrinkage. Some steps to provide a cross check on the amount of revenue received by a terminal are provided in the form of an electronic count, however, the electronic count is often disputed.

Figure 7:
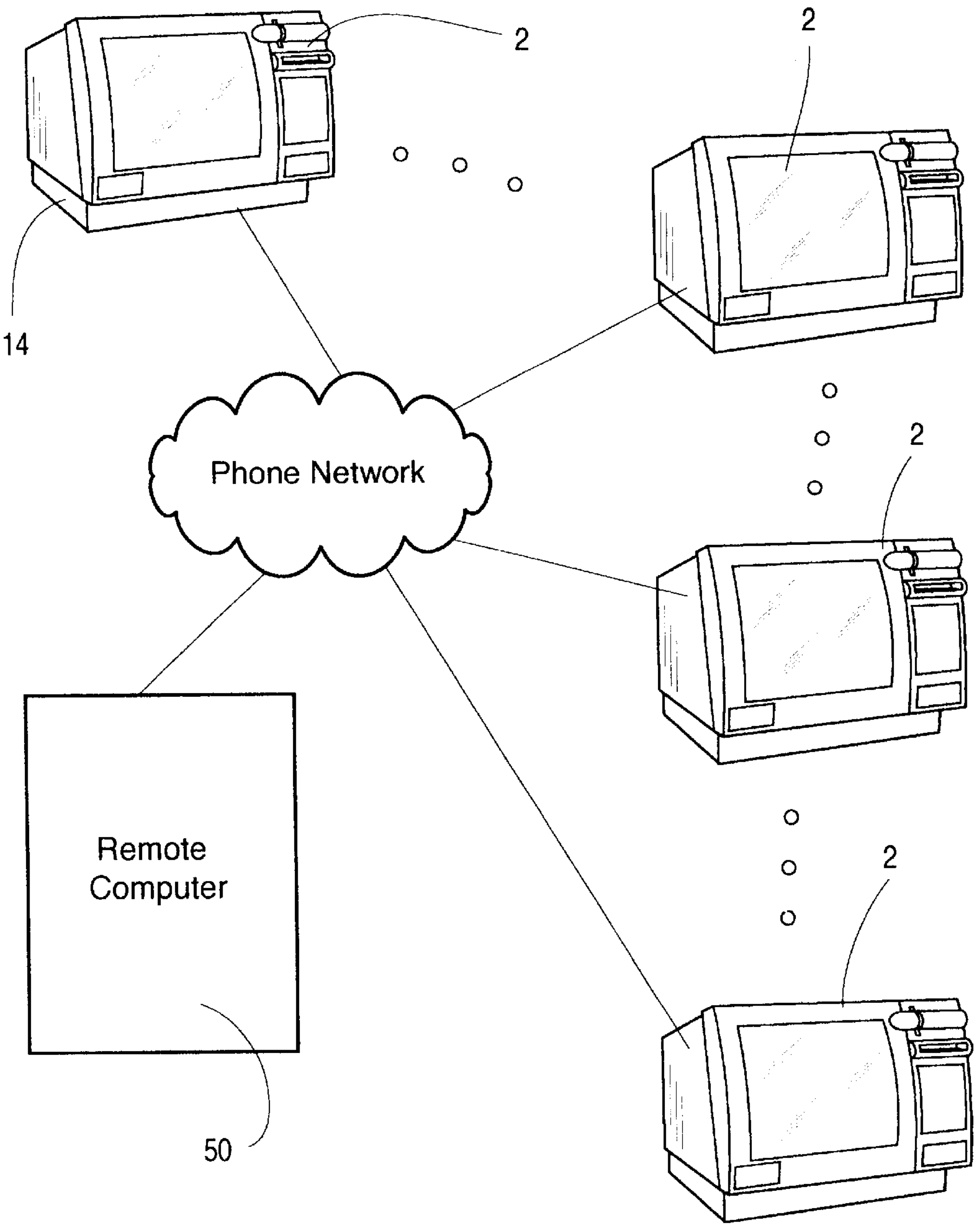
FIG. 7 is a schematic representation showing a series of game terminals linked by a remote computer.

Video game terminals which can operate in a tournament mode and in particular, a tournament mode where a host of different terminals are integrated such as that shown in FIG. 7, enhance revenue generation. The operation of a tournament mode where prizes are awarded are illegal in some jurisdictions. This is unfortunate as such tournaments do normally significantly increase the number of games played. The video game terminal of the present invention allows for a tournament mode where the individual results of a terminal are communicated to the remote computer 50 shown in FIG. 5. These results are tabulated and maintained and the overall leaders from all terminals are provided to each terminal for posting (see FIG. 5). The tournament is operated for personal satisfaction and the satisfaction derived from the competition. No prizes are awarded.

The video game terminal allows registration of a player by completing the registration screen of FIG. 4. During registration, a user inputs a "nickname" and a password, as well as his real name, and telephone number. The password and "nickname" allows the player to use the simplified sign in screen of FIG. 3 for subsequent games. The tournament mode does not assign prizes and merely allows different players to compete with players within their own location as well as to compete with players from other locations. The results are posted and tabulated and are viewable on each of the terminals. In addition, the registration process allows identification of the users and tracking of the games by user which information is available to the location operator and the terminal provider.

Furthermore, each registered user, when he initiates a game, is automatically entered in a random draw for which prizes are awarded. For each additional game that he plays, an additional entry in the random draw is made. This rewarding of registered users for playing of games by entry into a random draw, based on games played, satisfies the legal requirements of many jurisdictions. It has also been found to enhance the participation by all users as the prizes are not associated with the skill of the user. Skilled players still have the possibility to compete against other skilled players for the pure competitive enjoyment thereof with their results being posted to the particular terminals. In addition, they are entered in the random draw.

This format also is applicable to different types of game terminals and terminals of different speeds. Not all game terminals are identical and in most cases, there will be several different models which operate at different speeds. The speed of the game terminal increases the maximum game performance. Therefore, a skilled player using an older, slower game terminal is at a disadvantage relative to a skilled player using a faster game terminal. With the present system the awarding of prizes is based on games played and is unaffected by game results. This arrangement allows more game terminals to participate without a bias in the contest. Furthermore, not all terminals may operate the same games and entry to draw can be associated with games on one type of terminal and different group of games on a different type of terminal.

Figure 8:
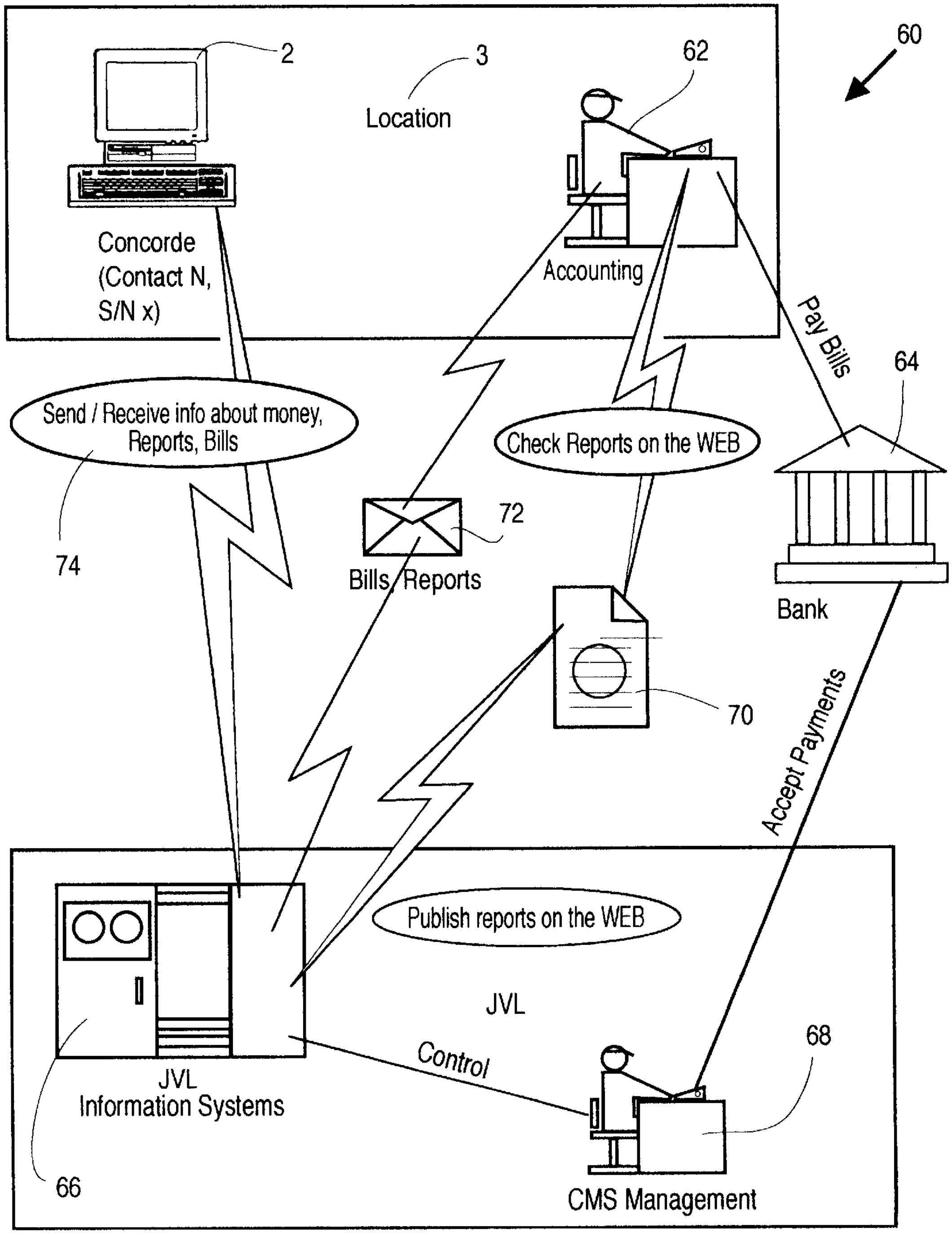
FIG. 8 is a schematic representation of a video game terminal system which allows revenue distribution between an operator and a terminal provider.

A further feature of the invention is shown in the system of FIG. 8. A host of video game terminals 2 are connected to a computer 66 and provide this central computer with information identifying the particular terminal, the location of the terminal, and counting information regarding the number of games played, identification of which games have been played, the revenue that has been received by the video game terminal, and user information. The central computer 66 tabulates the results from the individual terminal and combines them if there are a number of terminals at a particular location, and provides a report to the particular location. The report can be provided through the mail as indicated by communication line 72, back to the individual terminals indicated by the communication path 74, or can be posted on a webpage or sent by e-mail as indicated by path 70. In all cases, the accounting department of the particular location is provided with a report and bill information regarding the revenue collected by the individual terminals.

The operator of the particular location is provided with the keys to the cash box and is responsible for removing the funds which have been received. The bills that are provided to the particular location provide a summary of the revenue received and the portion of this revenue which is due to the terminal provider. In the system shown, the accounting group 62 of the location, authorizes a financial institution 64 to debit the account of the terminal provider.

If there is any dispute at the particular location between the funds collected and the report provided by the central computer, these can be immediately identified and resolved. If a particular location is always short, the terminals can be removed by the terminal provider as the report should be accurate. The terminal provider can also provide statistics of other locations regarding the accuracy of the reports. This arrangement provides an electronic reporting of revenue generated by particular terminals and avoids the necessity of having both parties present to empty the cash box and distribute the funds. It can be appreciated that this electronic system can involve a financial institution such that the funds can be electronically transferred from one account to another, based on the reports.

Appendix A lists one set of possible contest rules. These rules preferably can be accessed at each terminal (see FIG. 5) and displayed on the terminal screen. The rules preferably allow entry into the draw without any use of the terminal. Any party of an eligible mar age can mail in an entry to a particular location and if the entry meets the particular requirements, it will be entered in the draw. This capability may be required by certain jurisdictions for the draw to be acceptable.

With the present invention, the terminal provider as well as the operator can be provided with additional information which identifies the users of the terminals and the frequency at which the terminal is used by a particular user and the games selected by the user.

In a further option of the invention, it is possible to have a user purchase a home version of one or more of the games or certain games that are available for sale. The user can merely activate a purchase game icon, select the particular game which he is interested in purchasing and provide information with respect to the delivery of the game. Payment is made using the coin acceptor, or the bill validator, or a build-in credit/debit card reader. Preferrably, the purchase information is provided to a central computer and the computer game is delivered to the user by e-mail. Other delivery arrangements are possible.

The terminal has been described as having a touch screen input, however, a touch pad is also possible. The touch pad is less expensive but is typically more limited with respect to display capabilities.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A networked system of pay to play video game terminals where each terminal communicates with a remote central computer;

- each terminal including a series of video games stored in memory with said games displayed on said terminal for selection and play by a user,
- a payment arrangement for receiving payment and authorizing initiation of a game from a series of games retained in memory,
- said series of games including identification of a limited portion thereof eligible for qualifying the user for an entry into a random draw coordinated by said central computer,
- a registration query displayable on each terminal to allow registration of a new user or entry of a PIN assigned to a previously registered user for identification of the user with respect to said games eligible for said random draw,
- a counting arrangement for maintaining a count for each registered user which count is incremented based on the play of each eligible game associated with the registered user, and a communication arrangement for communicating with said remote central computer and providing thereto the counts of the different registered users for entry in a random draw based each count providing an opportunity to win.

2. A networked system as claimed in claim 1 wherein said registration query provides the user with a series of options including the option to decline registration or identification of the user.

3. A networked system as claimed in claim 1 wherein each terminal is a video display terminal having a touch screen.

4. A networked system as claimed in claim 3 wherein said registration query when activated for registration of a new user causes a form to be displayed on said video terminal together with a displayed keypad for entering information.

5. A networked system as claimed in claim 1 including a limited number of said series of games eligible for a tournament for fame contest where the names of the players with the highest score are displayed on said terminals based on the collective results received from the terminals.

6. A networked system as claimed in claim 4 wherein said remote computer and each game terminal communicates in a predetermined manner and each game terminal provides new registrations to said remote computer on a batch basis.

7. A networked system as claimed in claim 1 wherein said remote computer from time to time provides game terminals with a number of PINs and said game apparatus assigns one of said PINs to each new registration to uniquely identify the registration by said assigned PIN.

8. A networked system as coed in claim 7 wherein each game terminal maintains in non volatile memory said registrations and assigned PINs until said game terminal is in communication with said remote central computer.

9. A pay to play video game terminal comprising a touch screen for accommodating user input of information, a series of games displayed on said touch screen for possible selection and play by a user, said series of games including identification of a limited portion thereof eligible for play in a random draw contest mode, a payment arrangement for accepting payment and initiating play of any of said series of games, an on screen registration option for registration of a player with said terminal and automatically enter said player in a random draw based on the number of times any of said eligible games are played by a registered user, said game terminal including a counting arrangement for tracking the number of eligible games played by a registered user and automatically entering the registered users in a random draw based on the number of eligible games played identified as being played by the registered user.

10. A pay to play video game terminal as claimed in claim 9 wherein at least some of said games are operated in a tournament mode and a ranking is provided of at least several leading registered users and their particular best game results.

11. A pay to play video game terminal as claimed in claim 10 wherein said terminal includes a communication arrangement for communicating registration information and count information of a registered user to a remote computer which maintains the information for entry in the random draw.

12. A pay to play video game terminal as claimed in claim in claim 11 wherein said terminal includes a non volatile memory arrangement for maintaining registration information and count information until such information is communicated to the remote computer.

13. A pay to play video game ter as claimed in claim 12 wherein said game terminal includes user activated means for displaying the rules of the random draw contest on the touch screen.

14. A pay to play video game terminal as claimed in claim 12 including a limited number of games which are operated in a tournament mode and tournament mode games are clearly identified and distinguishable from non tournament mode games when said games are displayed on said touch screen for selection.

15. A pay to play video game terminal as claimed in claim 9 wherein certain of said series of games are available for purchase by a user and payment is made using said payment arrangement and delivery information is provided by the user using said touch screen to enter sufficient information to allow delivery of said game.

16. A pay to play video game tern as claimed in claim 15 wherein said terminal provides said game purchase and delivery information to said remote computer for delivery of said game to said email address.

17. A pay to play video game terminal as claimed in claim 9 wherein revenue collected by said video game terminal is divided between an onsite operator and a terminal provider, said terminal maintaining an electronic count of revenue collected and communicating said electronic count to a remote computer using said communication arrangement and said onsite operator is debited for the portion of the collected revenue due to terminal provider for the benefit of the terminal provider and said operator removes and receives the benefit of the revenue collected by said video game terminal.

18. A pay to play video game terminal as claimed in claim 9 wherein said limited portion of said series of games eligible for said random draw are also operated in tournament mode and said separate remote computer provides to said terminal a ranking of at least several leading registered users and their particular best game results which is displayed on said terminal.

* * * * *